(12) United States Patent
Sawada et al.

(10) Patent No.: US 11,198,930 B2
(45) Date of Patent: Dec. 14, 2021

(54) AUSTENITIC STAINLESS STEEL PLATE

(71) Applicant: NIPPON STEEL & SUMITOMO METAL CORPORATION, Tokyo (JP)

(72) Inventors: Masayoshi Sawada, Tokyo (JP); Yuichi Fukumura, Tokyo (JP)

(73) Assignee: NIPPON STEEL CORPORATION, Tokyo (JP)

(*) Notice: Subject to any disclaimer, the term of this patent is extended or adjusted under 35 U.S.C. 154(b) by 674 days.

(21) Appl. No.: 15/509,879

(22) PCT Filed: Sep. 15, 2015

(86) PCT No.: PCT/JP2015/076202
§ 371 (c)(1),
(2) Date: Mar. 9, 2017

(87) PCT Pub. No.: WO2016/043199
PCT Pub. Date: Mar. 24, 2016

(65) Prior Publication Data
US 2017/0298485 A1 Oct. 19, 2017

(30) Foreign Application Priority Data
Sep. 19, 2014 (JP) .............................. JP2014-191941

(51) Int. Cl.
*C22C 38/50* (2006.01)
*C22C 38/00* (2006.01)
(Continued)

(52) U.S. Cl.
CPC .............. *C22C 38/50* (2013.01); *C21D 6/004* (2013.01); *C21D 6/02* (2013.01); *C21D 8/02* (2013.01);
(Continued)

(58) Field of Classification Search
CPC .......... C22C 38/50; C22C 38/44; C22C 38/42; C22C 38/52; C22C 38/001; C22C 38/02;
(Continued)

(56) References Cited

U.S. PATENT DOCUMENTS 2,744,821 A * 5/1956 Osman .................... C22C 38/58
148/326
3,990,892 A * 11/1976 Machi ..................... C22C 38/44
420/37
(Continued)

FOREIGN PATENT DOCUMENTS

| CN | 1118381 | 3/1996 |
|---|---|---|
| CN | 1540026 | 10/2004 |

(Continued)

OTHER PUBLICATIONS

JPH11107720 machine translation (Year: 1999).*
(Continued)

*Primary Examiner* — Paul A Wartalowicz
*Assistant Examiner* — Stephani Hill
(74) *Attorney, Agent, or Firm* — Clark & Brody LP

(57) ABSTRACT

There is provided a precipitation-strengthened stainless steel plate having a chemical composition: by mass %, C: 0.01 to 0.10%; Si: 0.02 to 3.0%; Mn: 0.02 to 2.0%; Ni: 20 to 30%; Cr: 14 to 25.0%; Mo: 1.0 to 4.0%; Cu: 0.01 to 2.0%; Co: 0.01 to 0.5%; V: 0.1 to 1.0%; B: 0.001 to 0.01%; N: 0.02% or less; Ti: 2.0 to 5.0%; Al: 0.002 to 5.0%; Ti+Al: 3.3 to 6.0%; and the balance being Fe and impurities, the precipitation-strengthened stainless steel plate having a Vickers hardness Hv of 300 or higher, wherein the number density γ': $Ni_3(Al, Ti)$, which is an intermetallic compound, is 0 to 5/μm². As a heat resistant component material, the precipitation-strengthened stainless steel plate is less expensive than conventional Ni-based alloys such as NCF625 and
(Continued)

NCF718, and more excellent in high temperature properties than a precipitation-strengthened heat-resistant stainless steel such as SUH660.

2 Claims, 1 Drawing Sheet

(51) Int. Cl.

| | |
|---|---|
| *C22C 38/58* | (2006.01) |
| *C22C 38/02* | (2006.01) |
| *C22C 38/04* | (2006.01) |
| *C22C 38/06* | (2006.01) |
| *C22C 38/42* | (2006.01) |
| *C22C 38/44* | (2006.01) |
| *C22C 38/46* | (2006.01) |
| *C22C 38/48* | (2006.01) |
| *C22C 38/52* | (2006.01) |
| *C22C 38/54* | (2006.01) |
| *C21D 8/02* | (2006.01) |
| *C21D 9/46* | (2006.01) |
| *C21D 6/02* | (2006.01) |
| *C21D 6/00* | (2006.01) |

(52) U.S. Cl.
CPC ......... *C21D 8/0236* (2013.01); *C21D 8/0247* (2013.01); *C21D 9/46* (2013.01); *C22C 38/00* (2013.01); *C22C 38/001* (2013.01); *C22C 38/02* (2013.01); *C22C 38/04* (2013.01); *C22C 38/06* (2013.01); *C22C 38/42* (2013.01); *C22C 38/44* (2013.01); *C22C 38/46* (2013.01); *C22C 38/48* (2013.01); *C22C 38/52* (2013.01); *C22C 38/54* (2013.01); *C22C 38/58* (2013.01); *C21D 2211/001* (2013.01); *C21D 2211/004* (2013.01)

(58) Field of Classification Search
CPC ......... C22C 38/04; C22C 38/06; C22C 38/54; C22C 38/46; C22C 38/48; C22C 38/58; C22C 38/00; C21D 6/02; C21D 6/004; C21D 8/0247; C21D 8/0236; C21D 8/02; C21D 9/46; C21D 2211/004; C21D 2211/001; F16J 15/08
See application file for complete search history.

(56) References Cited

U.S. PATENT DOCUMENTS

| | | | | |
|---|---|---|---|---|
| 5,753,178 | A | * | 5/1998 | Davidson ................. C22C 38/50 420/53 |
| 5,948,182 | A | * | 9/1999 | Hamano ................. C22C 38/50 148/327 |
| 6,193,822 | B1 | * | 2/2001 | Nagashima ............... F01L 3/02 148/677 |
| 2003/0164213 | A1 | * | 9/2003 | Ueta ......................... C22F 1/10 148/677 |
| 2013/0266477 | A1 | | 10/2013 | Yamamoto et al. |

FOREIGN PATENT DOCUMENTS

| | | | | |
|---|---|---|---|---|
| CN | | 101151394 | | 3/2008 |
| CN | | 101194037 | | 6/2008 |
| CN | | 101613834 | | 12/2009 |
| CN | | 101642782 | | 2/2010 |
| JP | | 60110848 A | * | 6/1985 |
| JP | | S61-217555 A | * | 9/1986 |
| JP | | 04-048051 | | 2/1992 |
| JP | | 09-506933 | | 7/1997 |
| JP | | 10140296 A | * | 5/1998 |
| JP | | 11-107720 | | 4/1999 |
| JP | | H11107720 | * | 4/1999 ............. C22C 38/00 |
| JP | | 2000-329232 | | 11/2000 |
| JP | | 2005-002451 | | 1/2005 |
| JP | | 2008-304059 | | 12/2008 |
| JP | | 2009-249658 | | 10/2009 |
| JP | | 2010-520956 | | 6/2010 |
| JP | | 2014-047409 | | 3/2014 |
| JP | | 2014047409 A | * | 3/2014 |
| WO | WO-2009060900 A1 | | * | 5/2009 ............. C22C 38/58 |

OTHER PUBLICATIONS

Guo et al. "Quantification of precipitation hardening and evolution of precipitates." Materials Transactions, vol. 43, No. 6 (2002) pp. 1273 to 1282. (Year: 2002).*
JP 10-140296 machine translation (Year: 1998).*
Written English translation of [0018] of JP H11-107720 (Year: 1999).*
WO 2009/060900 machine translation (Year: 2009).*
JP 2014-047409 machine translation (Year: 2014).*
JP S61-217555 machine translation (Year: 1986).*
JP S60-110848 machine translation (Year: 1985).*
Hornbogen. "Inhibition of recrystallization in supersaturated solid solutions by large amounts of cold work" Journal of Materials science 12 (1977) 1565-1572. (Year: 1977).*
Xiaoming Cao et al., "Advanced Structural Materials", Chemical Industry Press, Apr. 2005.
"Heat Treatment Technology", Editorial Review Board for Mechanical Textbook for Schools of Technology, China Machine Press, Aug. 1980.

* cited by examiner

AUSTENITIC STAINLESS STEEL PLATE

TECHNICAL FIELD

The present invention relates to an austenitic stainless steel plate.

BACKGROUND ART

Austenitic stainless steel plates are used for a leaf spring, a belleville washer, and a sealing member used in various industrial facilities and the inside thereof, a heat resistant gasket in an exhaust manifold, a catalytic converter, an EGR cooler, a turbocharger, and the like of an automobile, a joint component of an aircraft, and the like.

In particular, for some of applications used at high temperatures, such as various kinds of industrial facilities and an automobile exhaust gasket, an expensive material containing 50% or more of Ni in percent by mass such as NCF625 and NCF718 defined in JIS G 4902 (corrosion-heat-resistant superalloy plate) is used. In contrast, a precipitation-strengthened stainless material utilizing intermetallic compounds of Ti and Al, such as SUH660 defined in JIS G 4312 (heat resistant steel plate) is significantly reduced in hardness after a long-time use at high temperatures, cannot be used only at up to about 500° C., and thus does not satisfy properties that has been demanded of a heat resistant gasket in recent years, where the use temperature is increased.

For example, Patent Document 1 proposes a heat resistant steel for an application, such as a disk on which blades of a gas turbine are implanted, and a jet engine, in which thermal fatigue properties are demanded, the heat resistant steel having a controlled Ti/Al ratio within ranges 10 to 40 and containing Ti: 1.5 to 2.5%, and Al: 0.05 to 0.20%.

In addition, Patent Document 2 and the like propose a heat resistant material utilizing a nitride rather than intermetallic compounds of Ti and Al.

LIST OF PRIOR ART DOCUMENTS

Patent Document

Patent Document 1: JP4-48051A
Patent Document 2: JP2009-249658A

DISCLOSURE OF THE INVENTION

Problems to be Solved by the Invention

Even the invention of Patent Document 1 fails to satisfy properties at high temperatures of 700° C. or higher that have been demanded in recent years.

The heat resistant steel proposed in Patent Document 2 contains 0.8% or more of N, therefore having a problem of very high manufacturing costs because of the need of pressurized melting facilities and heavy loads in heat rolling and cold rolling.

An object of the present invention is to provide an austenitic stainless steel plate that is suitable for use as a heat resistant component material, less expensive than conventional Ni-based alloys such as NCF625 and NCF718, and has a high hardness at higher temperatures than that of a precipitation-strengthened heat-resistant stainless steel such as SUH660.

Means for Solving the Problems

A heat resistant automobile gasket, one of technical fields that are subjects of the present invention, is mounted on an automobile, and the operating time thereof will reach several thousand hours, but a period of being exposed to a high temperature is limited to during high-speed driving or the like, and is intermittent. In addition, in the development of a novel material, it is difficult to conduct a test for several thousand hours, and practically, the properties of a starting material are evaluated based on properties of a starting material after being placed under high-temperature environment for about 400 hours, continuously. Assuming a use as a heat resistant gasket, it is desirable that the number density of γ': $Ni_3$(Al, Ti) is 50/μm$^2$ or more, and a room-temperature hardness is HV400 or higher after performing aging heat treatment at 700° C., the upper limit of operating temperature, and for 400 hours.

In general, a steel that has been used for a long time at high temperatures has a reduced hardness due to recovery, recrystallization, coarsening of grains, and the like, and cannot keep a sealing ability as a gasket. Also in a γ': $Ni_3$(Al, Ti) precipitation-strengthened heat resistant stainless steel such as SUH660 and one disclosed in Patent Document 2, γ': $Ni_3$(Al, Ti) transforms into an η phase in use at high temperatures, the η phase having a low precipitation strengthening ability, and has a reduced hardness. The present inventors considered that it is possible to suppress the reduction of hardness with the recovery, recrystallization, coarsening of grains by causing a compound to precipitate in use at high temperatures, not in producing, or rather to increase the hardness. To this end, it is essential to optimize the chemical composition such as the amounts of Ti and Al, as well as to optimize a solid solution heat treatment temperature, to optimize producing conditions such as adding finish cold rolling, and the like.

FIG. 1 illustrates FE-SEM micrographs of a comparative steel equivalent to SUH660, a conventional heat resistant steel, that is similar to inventive steel 2 in Example in Patent Document 2, and one of the steels according to the present invention, which are after being subjected to solid solution heat treatment, 60% cold rolling, and aging at 700° C. and for 400 hours that are the assumption of long-time use at high temperatures. The room-temperature hardnesses of both materials are HV297 and HV404, respectively. The steel according to the present invention (see FIG. 1(b)) has a lot of $Ni_3$(Al, Ti) when compared with the comparative steel (see FIG. 1(a)), $Ni_3$(Al, Ti) (hereafter, also simply referred to as γ') being an intermetallic compound around several to several tens of nm that contributes to strength (hardness) as precipitation strengthening. In both steel grades, part of γ' transforms into a phase having a low precipitation strengthening ability when being retained at a temperature of as high as 700° C. for a long time, but the steel according to the present invention keeps its hardness because a lot of γ' remains after long-time aging due to the adjustment of the chemical composition such as the amount of Ti+Al.

Based on the idea described above, the present inventors conducted detailed studies about the chemical composition of a material and the properties of the material after retention at high temperatures and accomplished the present invention as a result. The present invention has a gist of the following austenitic stainless steel plate.

(1) An austenitic stainless steel plate having a chemical composition comprising: by mass %,
C: 0.01 to 0.10%;
Si: 0.02 to 3.0%;
Mn: 0.02 to 2.0%;
Ni: 20.0 to 30.0%;
Cr: 14.0 to 25.0%;

Mo: 1.0 to 4.0%;
Cu: 0.01 to 2.0%;
Co: 0.01 to 0.5%;
V: 0.1 to 1.0%;
B: 0.001 to 0.01%;
N: 0.02% or less;
Ti: 2.0 to 5.0%;
Al: 0.002 to 5.0%;
Ti+Al: 3.3 to 6.0%;
Nb: 0 to 5.0%;
W: 0 to 5.0%; and
the balance being Fe and impurities,
the austenitic stainless steel plate having a Vickers hardness Hv of 300 or higher, wherein
a number density of $Ni_3(Al, Ti)$, which is an intermetallic compound, is 0 to $5.0/\mu m^2$.
(2) The austenitic stainless steel plate according to the above (1), containing, by mass %, Nb: 5.0% or less and/or W: 5.0% or less.

Advantageous Effects of the Invention

According to the present invention, it is possible to provide an austenitic stainless steel plate that is less expensive than conventional Ni-based alloys such as NCF625 and NCF718, and has a high hardness at high temperatures than that of a precipitation-strengthened heat-resistant stainless steel such as SUH660. This austenitic stainless steel plate is suitable for a heat resistant component material.

BRIEF DESCRIPTION OF THE DRAWINGS

FIG. 1 illustrates FE-SEM micrographs of steel plates after being subjected to solid solution heat treatment, 60% cold rolling, and aging at 700° C. for 400 hours, where

MODE FOR CARRYING OUT THE INVENTION

Figure 1A:
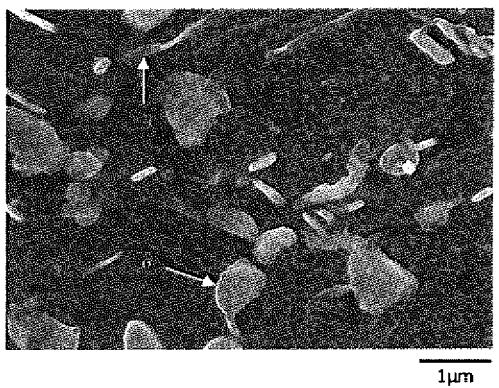
FIG. 1(a) illustrates a comparative steel, equivalent to SUH660, that is similar to inventive steel 2 in Example in Patent Document 2.
Figure 1B:
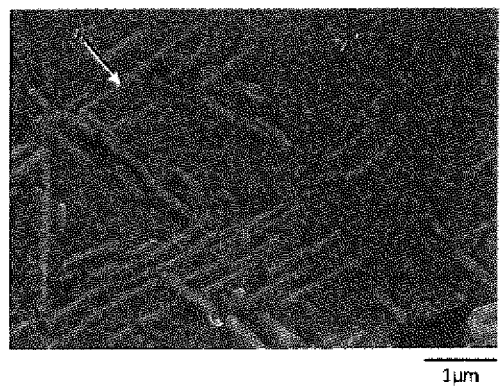
FIG. 1(b) illustrates one of the steels according to the present invention.

The present invention will be described in detail. Note that "mass %" will be hereinafter simply denoted by "%".
1. Chemical Composition
C: 0.01 to 0.10%
C (carbon) is an element that allows steel plate strength to be increased inexpensively, and thus 0.01% or more of C is to be contained. However, C contained in a large amount forms coarse TIC in melt, significantly suppressing the ductility of a product and suppressing the precipitation of $Ni_3(Al, Ti)$, which is a strengthened precipitate. Therefore, the upper limit of the content of C is set at 0.10%. A preferable lower limit of the content of C is 0.02%. A preferable upper limit of the content of C is 0.08%, more preferably 0.04% or less.
Si: 0.02 to 3.0%
Si (silicon) is used as a deoxidizer in melt, contributing to strengthening of steel. However, an excessively high content of Si leads to the destabilization of austenite phases. Consequently, the content of Si is set at 0.02 to 3.0%. A preferable lower limit of the content of Si is 0.1%. A preferable upper limit of the content of Si is 2.2%, more preferably 1.8%, still more preferably 1.0%.
Mn: 0.02 to 2.0%
Mn (manganese) contributes to brittle fracture prevention in hot working and strengthening of steel. However, containing Mn in a large amount leads to the degradation of oxidation resistance at high temperatures. Consequently, the content of Mn is set at 0.02 to 2.0%. A preferable lower limit of the content of Mn is 0.1%. A preferable upper limit of the content of Mn is 1.5%, more preferably 1.0%.
Ni: 20.0 to 30.0%
Ni (nickel) is an austenite former and an element indispensable to obtain austenite phases at room temperature stably. In addition, Ni is an element indispensable to form $Ni_3(Al, Ti)$ that contributes to an increase in strength during and after high-temperature use. Thus, the lower limit value of the content of Ni is set at 20.0%. However, an excessively high content of Ni leads to a significant rise in cost. Therefore, the upper limit value of the content of Ni is set at 30.0%. A preferable lower limit of the content of Ni is 20.5%, and a more preferable lower limit of the content of Ni is 22.0%. A preferable upper limit of the content of Ni is 28.1%, and a more preferable upper limit of the content of Ni is 27.0%.
Cr: 14.0 to 25.0%
Cr (chromium) is a basic element of stainless steel and has an effect of forming a metal oxide layer on the surface of steel material to increase corrosion resistance. However, an excessively high content of Cr leads to the generation of a cr phase, which contains FeCr as its basic composition, in a large amount, resulting in a significant embrittlement of a product. Consequently, the content of Cr is set at 14.0 to 25.0%. A preferable lower limit of the content of Cr is 14.5%. A preferable upper limit of the content of Cr is 22.2%, more preferably 20.0%.
Mo: 1.0 to 4.0%
Mo (molybdenum) enhances the high temperature strength of a material. However, Mo is a very expensive element, and an excessively high content of Mo also leads to a rise in cost. Consequently, the content of Mo is set at 1.0 to 4.0%. A preferable lower limit of the content of Mo is 2.0% or more. A preferable upper limit of the content of Mo is 3.2%.
Cu: 0.01 to 2.0%
A proper content of Cu (copper) has an effect of enhancing cold rolling workability. However, containing Cu in a large amount leads to a degradation in hot workability. Consequently, the content of Cu is set at 0.01 to 2.0%. A preferable lower limit of the content of Cu is 0.05%, more preferably 0.1%. A preferable upper limit of the content of Cu is 1.2%, more preferably 1.0%.
Co: 0.01 to 0.5%
Co (cobalt) has an effect of increasing high temperature strength when dissolved in a parent phase. The content of Co is set at 0.01% or more. However, Co is an expensive element, and containing Co in a large amount leads to a rise in cost of starting material. Therefore, the upper limit of the content of Co is 0.5%. A preferable lower limit of the content of Co is 0.10%. A preferable upper limit of the content of Co is 0.30%, more preferably 0.20%.
V: 0.1 to 1.0%
V (vanadium) generates a fine carbide, nitride, and carbo-nitride thereof and thus is an element effective in increasing high temperature strength. Consequently, the content of V is set at 0.1% or more. However, an excessively high content of V leads to the generation of undissolved coarse carbide, nitride, carbo-nitride thereof in melt and in solution treatment, resulting in a significant degradation in the ductility and the like of the product. Thus, the upper limit of the content of V is set at 1.0%. A preferable lower limit of the content of V is 0.2% or more. A preferable upper limit of the content of V is 0.5%, more preferably 0.3%.

B: 0.001 to 0.01%

A proper content of B (boron) leads to a strengthened grain boundary, contributing to high temperature strength. However, containing B in a large amount leads to a significant degradation in hot workability. Consequently, the content of B is set at 0.001 to 0.01%. A preferable lower limit of the content of B is 0.003%, more preferably 0.006%. A preferable upper limit of the content of B is 0.01%, more preferably 0.007%.

N: 0.02% or less

N (nitrogen) contained in a large amount combines with Ti and Al in melt to generate coarse TiN and AlN. As a result, the amount of the generation of $Ni_3(Al, Ti)$ during aging is reduced. Consequently, N is set at 0.02%. A preferable lower limit of the content of N is 0.001%, more preferably 0.005%. A preferable upper limit of the content of N is 0.012%.

Ti: 2.0 to 5.0%

Ti (titanium) is an element indispensable to form $Ni_3(Al, Ti)$ that contributes to an increase in strength during and after high-temperature use. Consequently, the content of Ti is set at 2.0% or more. An excessively high content of Ti leads to a lot of inclusions in melt, resulting in a significant degradation in the ductility and the like of the product. Thus, the upper limit of the content of Ti is set at 5.0%. A preferable lower limit of the content of Ti is 2.0%, more preferably 3.0%, still more preferably 4.0%. A preferable upper limit of the content of Ti is 4.5%, more preferably 4.1%.

Al: 0.002 to 5.0%

Al (aluminum) is an element indispensable to form $Ni_3(Al, Ti)$ that contributes to an increase in strength during and after high-temperature use. Consequently, the content of Al is set at 0.002% or more. An excessively high content of Al leads to a lot of inclusions in melt, resulting in a significant degradation in the ductility and the like of the product. Thus, the upper limit of the content of Al is set at 5.0%. A preferable lower limit of the content of Al is 0.1%, more preferably 1.0%. A preferable upper limit of the content of Al is 4.0%.

Ti+Al: 3.3 to 6.0%

Al and Ti are both elements indispensable to form $Ni_3(Al, Ti)$ that contributes to an increase in strength. Thus, the total content of both elements is set at 3.3% or more. However, containing both elements in a large amount leads to the formation of coarse nitrides thereof or the like in melt, resulting in a significant degradation in hot workability. Therefore, the upper limit of the total content is set at 6.0%. A preferable lower limit of the total content is 3.5%, more preferably 3.9%, still more preferably 4.0%. A preferable upper limit of the total content is 5.9%.

Nb: 0 to 5.0%

Nb (niobium) generates a fine carbide, nitride, and carbonitride thereof, or a Laves phase thereof and thus is an element effective in increasing high temperature strength. Thus, Nb may be contained. However, an excessively high content of Nb may result in a reduction in hot workability, may suppress recrystallization, non-recrystallized portions remaining in a large amount after annealing, and further leads to an increase in cost of starting material. Therefore, when Nb is to be contained, the content of Nb is set at 5.0% or less. In order to exert the effect described above, the content of Nb is preferably set at 0.1% or more. A more preferable lower limit of the content of Nb is 0.5%, still more preferably 1.0%. A preferable upper limit of the content of Nb is 4.0%, more preferably 3.93%.

W: 0 to 5.0%

W (tungsten) generates a Laves phase thereof, as with Nb, and thus is an element effective in increasing high temperature strength. Thus, W may be contained. However, an excessively high content of W may result in the embrittlement of material and leads to an increase in cost of starting material. Therefore, when W is to be contained, the content of W is set at 5.0% or less. In order to exert the effect described above, the content of W is preferably set at 1.0% or more. A more preferable lower limit of the content of W is 1.10%. A preferable upper limit of the content of W is 4.0%.

Balance: Fe and Impurities

The balance other than the elements described above is Fe and impurities. In producing stainless steel, scrap raw materials are often used from the viewpoint of promoting recycling. For this reason, a stainless steel has various impurity elements inevitably mixed in. For this reason, it is difficult to determine the contents of the impurity elements. Therefore, impurities in the present invention mean elements that are contained in an amount by which the operational advantages of the present invention are not inhibited. Such impurities include, for example, P: 0.05% or less, and S: 0.05% or less.

2. Vickers Hardness HV: 300 or Higher

The austenitic stainless steel plate of the present invention has a Vickers hardness HV of 300 or higher. In the present invention, a steel having the chemical composition as previously described is subjected to, as will be described, cold rolling after solid solution heat treatment, so that the micro-structure of the steel is changed such as increasing the strength of the starting material through work hardening, introducing a large amount of dislocations into grains, and increasing the amount of precipitation sites in grains. This causes fine γ' to precipitate in a large amount in use at high temperatures, enabling the hardness to be kept. Since the steel plate according to the present invention has such a micro-structure, the Vickers hardness HV thereof shows 300 or higher before use. In order to obtain excellent properties from the beginning after use, the hardness HV is preferably 340 or higher before use.

3. Number Density of $Ni_3(Al, Ti)$: 0 to 5.0/$\mu m^2$

As previously described, in an application such as an automobile exhaust gasket that is used at high temperatures, the strength of the steel plate is increased by the precipitation of $Ni_3(Al, Ti)$ during use. For this reason, at the stage of starting material, namely before use, $Ni_3(Al, Ti)$ needs to be dissolved as much as possible. Specifically, the number density of $Ni_3(Al, Ti)$ is set at 0 to 5.0/$\mu m^2$. Consequently, $Ni_3(Al, Ti)$ is an optional intermetallic compound that need not be contained. The particle size and the shape of $Ni_3(Al, Ti)$ are not limited in particular, as long as the strength of the steel materials is increased, but $Ni_3(Al, Ti)$ preferably has a substantially spherical shape having a particle size of 10 to 50 nm. A method for measuring the number density is to observe 10 or more spots each having an area of 10 μm×5 μm under a scanning electron microscope at 10000 to 30000-fold magnification and to perform calculation by dividing the number of all precipitates by the observation area. If the measurement area is narrower than that previously described, variations may occur in the number density. The size of a precipitate observable under a SEM is approximately 10 nm or more.

4. Micro-Structure of Steel Plate after Use at High Temperatures: Number. Density of γ' ($Ni_3(Al, Ti)$): 50/$\mu m^2$ or More, Vickers Hardness HV: 400 or Higher Since the austenitic stainless steel plate according to the present invention is manufactured by subjecting a steel having the chemical composition previously described to, after solid solution heating treatment, cold rolling at a predetermined rolling reduction. Therefore, the number density of γ' becomes 50/μm² or more after aging treatment at 700° C. and for 400 hours. The steel plate subjected to precipitation strengthening in such a manner shows a Vickers hardness HV of 400 or higher.

5. Manufacturing Method

In the present invention, an ingot is melted by melting a molten steel having a chemical composition previously described using a converter or an electric furnace and thereafter casting the molten steel in a mold to form the ingot. This ingot is worked into a shape that allows hot rolling, by cutting working and hot forging, the shape. After the working, hot rolling, annealing, and descaling are performed, and cold rolling and annealing are repeated, so as to obtain a desired steel plate. If an excessively low heating temperature before the hot rolling results in an increase in hot deformation resistance, and thus the heating temperature is set at 1040° C. or higher. A high heating temperature before the hot rolling results in remarkable cracks in hot deformation, and thus the heating temperature is set at 1160° C. or lower.

The austenitic stainless steel plate according to the present invention is increased the strength thereof by utilizing precipitation strengthening. Therefore, it is important to cause the compound having precipitated in producing to dissolve in solid solution heat treatment so as to cause a fine intermetallic compound to precipitate in use at high temperatures. For example, Example in Patent Document 2 describes that solution treatment is performed at 900° C. for one hour. However with the chemical composition according to the present invention, in order to cause the precipitate generated in the previous operation to dissolve, the solid solution heat treatment is desirably performed at 930° C. or higher. As in the present invention, in the case of a γ-based stainless steel containing alloying elements in a large amount, if a solid solution heat treatment temperature is excessively high, grain boundaries melt, and impurity elements such as S and P segregate on grain boundaries, in some cases resulting in edge cracking in cold rolling performed thereafter. Consequently, the solid solution heat treatment temperature may be set at 1040° C. or lower, although the upper limit value thereof is not limited in particular.

A precipitation-strengthened stainless steel such as SUH660 is generally subjected to, after solid solution heat treatment, aging treatment at around 730° C. and for 16 hours. According to the invention described in Patent Document 2, after solution treatment, aging treatment is performed at 705° C. and for 16 hours, and subsequently aging treatment is performed at 650° C. and for 16 hours. In contrast, in the present invention, a steel plate having the chemical composition previously described is subjected to, after solid solution heat treatment, cold rolling without precipitating the intermetallic compound, so that it is possible to achieve the high strength of the starting material through work hardening, as well as to increase the precipitation sites in the grains by introducing a lot of dislocations in grains, and to cause precipitates to precipitate in a large amount in use at high temperatures. To this end, it is desirable to perform the cold rolling at a rolling reduction of 30% or higher after the solid solution heat treatment.

Example

The chemical compositions of specimens are shown in Table 1. Components out of the ranges according to the present invention have numbers marked "*". A to M in Table 1 are compositions that satisfy the specifications according to the present invention, and N to W are compositions for comparison that do not satisfy the specifications

TABLE 1

| TYPE | STEEL GRADE | STEEL PLATE | CHEMICAL COMPOSITION (MASS %) THE BALANCE Fe AND IMPURITIES | | | | | | | | | | | | | |
|---|---|---|---|---|---|---|---|---|---|---|---|---|---|---|---|---|
| | | | C | Si | Mn | Ni | Cr | Mo | Cu | Co | V | B | N | Ti | Al | Ti + Al |
| INVENTIVE EXAMPLE | A | 1 | 0.04 | 0.1 | 0.2 | 24.9 | 15.0 | 1.2 | 0.1 | 0.15 | 0.3 | 0.006 | 0.002 | 4.1 | 0.1 | 4.2 |
| | B | 2 | 0.04 | 0.1 | 0.2 | 25.0 | 15.0 | 1.2 | 0.1 | 0.15 | 0.3 | 0.006 | 0.002 | 3.3 | 2.0 | 5.3 |
| | | 3 | | | | | | | | | | | | | | |
| | | 4 | | | | | | | | | | | | | | |
| | C | 5 | 0.04 | 2.2 | 0.2 | 24.9 | 15.0 | 3.2 | 0.1 | 0.15 | 0.3 | 0.006 | 0.002 | 4.1 | 0.1 | 4.2 |
| | D | 6 | 0.05 | 0.1 | 0.2 | 25.0 | 15.0 | 1.2 | 1.2 | 0.15 | 0.3 | 0.006 | 0.002 | 3.9 | 0.5 | 4.4 |
| | E | 7 | 0.04 | 0.1 | 0.2 | 24.9 | 15.0 | 1.2 | 0.1 | 0.15 | 0.3 | 0.006 | 0.002 | 4.1 | 0.1 | 4.2 |
| | F | 8 | 0.04 | 0.1 | 0.2 | 24.9 | 15.0 | 1.2 | 0.1 | 0.15 | 0.3 | 0.006 | 0.002 | 4.1 | 0.1 | 4.2 |
| | | 9 | | | | | | | | | | | | | | |
| | | 10 | | | | | | | | | | | | | | |
| | G | 11 | 0.04 | 0.1 | 0.2 | 25.1 | 16.0 | 1.2 | 0.1 | 0.15 | 0.3 | 0.006 | 0.002 | 4.0 | 0.1 | 4.1 |
| | H | 12 | 0.04 | 0.1 | 0.2 | 24.9 | 15.0 | 1.2 | 0.1 | 0.15 | 0.3 | 0.005 | 0.002 | 4.1 | 0.1 | 4.2 |
| | I | 13 | 0.04 | 0.1 | 0.2 | 24.9 | 15.0 | 1.2 | 0.1 | 0.15 | 0.3 | 0.006 | 0.002 | 2.1 | 3.8 | 5.9 |
| | J | 14 | 0.02 | 0.5 | 0.1 | 24.8 | 18.0 | 2.0 | 0.5 | 0.10 | 0.2 | 0.003 | 0.012 | 4.1 | 0.1 | 4.2 |
| | K | 15 | 0.08 | 0.1 | 1.6 | 23.1 | 14.5 | 1.0 | 0.12 | 0.25 | 0.2 | 0.005 | 0.002 | 3.1 | 0.8 | 3.9 |
| | L | 16 | 0.02 | 1.8 | 0.5 | 20.5 | 16.5 | 2.5 | 0.5 | 0.03 | 0.2 | 0.006 | 0.002 | 4.1 | 0.3 | 4.4 |
| | M | 17 | 0.04 | 0.3 | 0.3 | 27.7 | 22.2 | 2.0 | 0.1 | 0.40 | 0.1 | 0.007 | 0.002 | 3.8 | 0.4 | 4.2 |
| COMPARATIVE EXAMPLE | N | 18 | 0.04 | 0.2 | 0.3 | 18.1* | 14.6 | 1.2 | 0.1 | 0.15 | 0.3 | 0.005 | 0.002 | 3.1 | 1.0 | 4.1 |
| | O | 19 | 0.04 | 0.1 | 0.2 | 24.9 | 25.1* | 1.2 | 0.1 | 0.15 | 0.3 | 0.006 | 0.002 | 3.2 | 1.2 | 4.4 |
| | P | 20 | 0.04 | 0.1 | 0.2 | 24.9 | 16.1 | 0.2* | 0.1 | 0.15 | 0.3 | 0.006 | 0.002 | 3.9 | 0.2 | 4.1 |
| | Q | 21 | 0.04 | 0.1 | 0.2 | 25.1 | 15.1 | 1.1 | 0.1 | 0.15 | 0.3 | 0.005 | 0.002 | 0.5* | 0.1 | 0.6* |
| | R | 22 | 0.04 | 0.1 | 0.2 | 25.0 | 15.1 | 1.2 | 0.1 | 0.15 | 0.3 | 0.005 | 0.001 | 2.0 | 0.1 | 2.1* |
| | S | 23 | 0.04 | 0.1 | 0.2 | 24.8 | 15.0 | 1.2 | 0.1 | 0.15 | 0.3 | 0.005 | 0.002 | 2.0 | 0.1 | 2.1* |
| | T | 24 | 0.04 | 0.1 | 0.2 | 25.1 | 16.1 | 1.1 | 0.1 | 0.15 | 0.3 | 0.005 | 0.002 | 3.1 | 3.1 | 6.2* |
| | U | 25 | 0.04 | 0.1 | 0.2 | 25.1 | 15.1 | 1.1 | 0.1 | 0.15 | 0.3 | 0.005 | 0.002 | 3.1 | 0.1 | 3.2* |
| | V | 26 | 0.04 | 0.1 | 0.2 | 25.0 | 15.2 | 1.2 | 0.1 | 0.15 | 0.3 | 0.005 | 0.001 | 2.1 | 0.1 | 2.2* |
| | W | 27 | 0.04 | 0.1 | 0.2 | 24.9 | 15.0 | 1.2 | 0.1 | 0.15 | 0.3 | 0.006 | 0.122* | 1.2* | 4.0 | 6.2 |
| | A | 28 | 0.04 | 0.1 | 0.2 | 24.9 | 15.0 | 1.2 | 0.1 | 0.15 | 0.3 | 0.006 | 0.002 | 4.1 | 0.1 | 4.2 |
| | | 29 | | | | | | | | | | | | | | |
| | | 30 | | | | | | | | | | | | | | |
| | C | 31 | 0.04 | 2.2 | 0.2 | 24.9 | 15.0 | 3.2 | 0.1 | 0.15 | 0.3 | 0.006 | 0.002 | 4.1 | 0.1 | 4.2 |

TABLE 1-continued

| | | | CHEMICAL COMPOSITION (MASS %) THE BALANCE Fe AND IMPURITIES | | SOLID SOLUTION HEAT TREATMENT | | COLD ROLLING RATIO | BEFORE USE | | AFTER AGING AT 700° C. × 400 hr | |
|---|---|---|---|---|---|---|---|---|---|---|---|
| | | | | | | | | NUMBER DENSITY OF γ' | HARDNESS | NUMBER DENSITY OF γ' | HARDNESS |
| STEEL TYPE | STEEL GRADE | STEEL PLATE | Nb | W | TEMPERATURE (° C.) | TIME (s) | (%) | (/μm²) | (HV) | (/μm²) | (HV) |
| INVENTIVE EXAMPLE | A | 1 | — | — | 980 | 60 | 60 | 0 | 355 | 98 | 404 |
| | B | 2 | — | — | 980 | 60 | 60 | 0 | 365 | 199 | 420 |
| | | 3 | | | 980 | 60 | 50 | 0 | 344 | 175 | 417 |
| | | 4 | | | 980 | 60 | 35 | 0 | 310 | 88 | 411 |
| | C | 5 | — | — | 980 | 60 | 60 | 0 | 357 | 106 | 438 |
| | D | 6 | — | — | 980 | 60 | 60 | 0 | 358 | 125 | 406 |
| | E | 7 | 1.20 | — | 980 | 60 | 60 | 0 | 377 | 102 | 420 |
| | F | 8 | 3.93 | — | 980 | 60 | 60 | 0 | 397 | 108 | 465 |
| | | 9 | | | 980 | 60 | 50 | 0 | 372 | 94 | 455 |
| | | 10 | | | 980 | 60 | 35 | 0 | 345 | 60 | 431 |
| | G | 11 | — | 2.04 | 980 | 60 | 60 | 0 | 366 | 99 | 434 |
| | H | 12 | — | 3.93 | 980 | 60 | 60 | 0 | 378 | 102 | 466 |
| | I | 13 | 0.55 | — | 980 | 60 | 70 | 3 | 376 | 170 | 420 |
| | J | 14 | 0.50 | 2.10 | 980 | 60 | 60 | 0 | 382 | 100 | 479 |
| | K | 15 | — | — | 1030 | 60 | 60 | 0 | 360 | 91 | 420 |
| | L | 16 | 0.10 | 1.10 | 1030 | 60 | 60 | 2 | 380 | 154 | 442 |
| | M | 17 | — | — | 980 | 60 | 60 | 0 | 350 | 135 | 432 |
| COMPARATIVE EXAMPLE | N | 18 | — | — | 980 | 60 | 60 | 0 | 352 | 0 | 370 |
| | O | 19 | — | — | 980 | 60 | 60 | 0 | 355 | 20 | 390 |
| | P | 20 | — | — | 980 | 60 | 60 | 0 | 355 | 102 | 380 |
| | Q | 21 | — | — | 980 | 60 | 60 | 0 | 307 | 0 | 216 |
| | R | 22 | — | 3.98 | 980 | 60 | 60 | 0 | 349 | 40 | 361 |
| | S | 23 | 3.93 | — | 980 | 60 | 60 | 0 | 395 | 35 | 358 |
| | T | 24 | — | — | — | — | — | —* | —* | — | — |
| | U | 25 | — | — | 980 | 60 | 60 | 0 | 343 | 55 | 349 |
| | V | 26 | — | — | 980 | 60 | 60 | 0 | 334 | 38 | 297 |
| | W | 27 | — | — | 980 | 60 | 60 | 0 | 356 | 20 | 370 |
| | A | 28 | — | — | 900 | 60 | 60 | 15* | 357 | 35 | 390 |
| | | 29 | | | 980 | 60 | 10 | 0 | 290* | 0 | 372 |
| | | 30 | | | 1090 | 60 | — | —* | —* | — | — |
| | C | 31 | — | — | 1050 | 60 | — | —* | —* | — | — |

THE MARK*** INDICATES THAT THE CHEMICAL COMPOSITION FELL OUT OF THE RANGE DEFINED IN THE PRESENT INVENTION.

Small ingots having compositions A to W shown in Table 1 were melted, subjected to cutting working, hot forging, hot rolling, annealing, and descaling, and repeatedly subjected to cold rolling and annealing. The resultants were subjected to solid solution heat treatment, and thereafter finish cold rolling. The final plate thicknesses of specimens were all adjusted to 0.2 mm.

The hardness at the plate thickness center of a section in a direction parallel to a plate thickness direction was measured with a load of 100 gf using a Vickers hardness tester. In addition, the number density of γ' was measured from micrographs captured using an FE-SEM. Furthermore, a hardness after aging at 700° C. and for 400 hours, the hardness being an indicator of whether or not to be applicable as a heat resistant material, and the number density of γ' were measured by a method similar to one previously described. The results are shown in Table 1.

Steel plates 1 to 17 shown in Table 1 satisfied the specifications according to the present invention, having a number density of γ' of 50/μm² or more, and a hardness of higher than HV400, after the aging at 700° C. and for 400 hours. By comparing the steel plates 1, 7, and 8, it is understood that a proper content of Nb effectively acts on the hardness after the aging. In addition, by comparing the steel plates 1, 11, and 12, it is understood that a proper W content effectively acts on the hardness after the aging.

In contrast, steel plates 18 to 29 were steel plates for comparison, the hardnesses of which do not reach HV400. The steel plates 18, 21, 22, 23, 25, and 26 had small amounts of Ni, Ti, and Al, which prevented γ' contributing strengthening from precipitating sufficiently, and thus the hardnesses after the aging were low.

It is noted that the steel plate 26 is equivalent to conventional SUH660, being a material similar to inventive steel 2 in Example in Patent Document 2.

The steel plate 19 had a large amount of Cr, which led to the precipitation of a phase (an intermetallic compound mainly including Fe and Cr), which is an embrittled layer, in a large amount in aging treatment. Thus, the steel plate 19 became significantly brittle, and the hardness thereof was not satisfactory.

The steel plate 20 had a small amount of Mo, the hardness of the base thereof was low, and the hardness thereof after the aging did not satisfy HV400, either.

The steel plate 24 had high contents of Ti and Al, which led to a lot of cracks occurring in the hot forging. Thus, the manufacture of the steel plate failed.

The steel plate 27 had a large amount of N, which led to the generation of coarse TiN, AlN in a large amount in producing, resulting in a small amount of intended γ' and a low hardness after the aging.

The steel plate 28 had a chemical composition that satisfied the specifications according to the present invention, but the solid solution heat treatment temperature was low, and the precipitate generated in producing was not dissolved, resulting in a number density of γ' before use out of the specifications according to the present invention. This steel plate had a small amount of γ' after the aging at 700° C. and for 400 hours, and the hardness thereof did not reach HV400.

The steel plate 29 also had a chemical composition that satisfied the specifications according to the present invention, but the rolling reduction of the cold rolling after the solid solution heat treatment was low, which led to insufficient precipitation of compound contributing to strengthening, resulting in a hardness after the aging not satisfying HV400.

The steel plates 30 and 31 had chemical compositions that satisfied the specifications according to the present invention, but the solid solution heat treatment temperature was high, which led to the occurrence of remarkable edge cracking in the cold rolling performed thereafter. Therefore, an intended specimen having a thickness of 0.2 mm could not be manufactured and the evaluation thereof could not be made, either.

Although the present examples have been described assuming the use as a heat resistant exhaust gasket member of an automobile, the present invention is not limited to the embodiment described above, and can be used in applications where spring properties and sealing ability at high temperatures are demanded, such as a leaf spring, a belleville washer, and a sealing member used in industrial facilities, a heat resistant gasket in an exhaust manifold, a catalytic converter, an EGR cooler, a turbocharger, and the like of an automobile, and a joint component and the like of an aircraft, without departing the scope of the concept of the present invention.

INDUSTRIAL APPLICABILITY

According to the present invention, it is possible to provide an austenitic stainless steel plate that is less expensive than conventional Ni-based alloys such as NCF625 and NCF718, and has a high hardness at high temperatures than that of a precipitation-strengthened heat-resistant stainless steel such as SUH660. This austenitic stainless steel plate is suitable for a heat resistant component material.

The invention claimed is:

1. An austenitic stainless steel plate having a chemical composition consisting of: by mass %,
   C: 0.01 to 0.10%;
   Si: 0.02 to 3.0%;
   Mn: 0.02 to 2.0%;
   Ni: 20.0 to 30.0%;
   Cr: 14.0 to 25.0%;
   Mo: 1.0 to 4.0%;
   Cu: 0.01 to 2.0%;
   Co: 0.01 to 0.5%;
   V: 0.1 to 1.0%;
   B: 0.001 to 0.01%;
   N: 0.02% or less;
   Ti: more than 3.0 to 5.0%;
   Al: 0.002 to 5.0%;
   Ti+Al: 3.3 to 6.0%;
   Nb: 0 to 5.0%;
   W: 0 to 5.0%; and
   the balance being Fe and impurities,
   the austenitic stainless steel plate having a Vickers hardness Hv of 300 or higher, wherein
   a number density of $Ni_3(Al, Ti)$, which is an intermetallic compound, is 0 to $5.0/\mu m^2$.

2. The austenitic stainless steel plate according to claim 1, containing, by mass %, Nb: 0.1 to 5.0% and/or W: 1.0 to 5.0%.

* * * * *